United States Patent

Stein

[11] Patent Number: 5,137,259
[45] Date of Patent: Aug. 11, 1992

[54] SELF ADJUSTING ENERGIZED VALVE SEAL

[75] Inventor: Reuven Stein, Laguna Beach, Calif.

[73] Assignee: Kaiser Aerospace and Electronics Corporation, Foster City, Calif.

[21] Appl. No.: 793,225

[22] Filed: Nov. 8, 1991

Related U.S. Application Data

[63] Continuation of Ser. No. 591,367, Oct. 1, 1990, abandoned.

[51] Int. Cl.⁵ ............................................. F16K 5/06
[52] U.S. Cl. .................................. 251/174; 251/315
[58] Field of Search ............. 251/174, 315, 170, 171, 251/172, 173

[56] References Cited

U.S. PATENT DOCUMENTS

| | | | |
|---|---|---|---|
| 4,220,172 | 9/1980 | Stager | 251/174 X |
| 4,258,901 | 3/1981 | Zinnai et al. | 251/315 X |
| 4,272,054 | 6/1981 | Zinnai | 251/173 |
| 4,483,511 | 11/1984 | Kushida et al. | 251/174 |
| 4,658,847 | 4/1987 | McCrone | 251/174 X |
| 4,741,509 | 5/1988 | Bunch et al. | 251/328 X |

*Primary Examiner*—John C. Fox
*Attorney, Agent, or Firm*—Marvin H. Kleinberg

[57] ABSTRACT

A seal and seat for ball valves is a circular, elastomeric open torus which is fitted between the ball element and the housing. The open torus has within it, a substantially "v" shaped spring that is fitted within the "u" shaped opening of the torus. In normal operation, the spring member is slightly compressed between the ball and the housing and the ball can "float" between a pair of substantially similar seals on the input and output sides of the ball valve, respectively.

10 Claims, 4 Drawing Sheets

SELF ADJUSTING ENERGIZED VALVE SEAL

This is a continuation of copending application Ser. No. 07/591,367, filed on Oct. 1, 1990, now abandoned.

The present invention relates to valve seals and, more particularly, an improved, dynamic self adjusting seal for a ball valve that establishes a predetermined contact pressure between the ball and the seal that is substantially independent of the fluid pressures in the lines controlled by the valve.

BACKGROUND OF INVENTION

Conventional ball valves are mounted in a rigid seat or seal, which is a primary seal and which may be backed by O-rings to act as a secondary seal. Alternatively, other, specially configured elastomeric rings of special geometry can be used to insure that the ball remains sealed during operation of the valve. In many valves, however, only the seal on the pressurized side of the valve is maintained in contact with the ball while the other seal tends to "float".

When employed in an aircraft lavatory system, the ball valve seals may both be under pressure at different times and accordingly, these seals must be kept in close contact with the ball valve surface at all times, which tends to increase the drag or frictional resistance to the actuation of the valve.

An additional problem encountered by the seals that are utilized in aircraft lavatory systems is the hostile environment created by the chemicals that are found in the flushing solutions and other fluids that are found in such a system. These chemicals frequently react with the conventional elastomers heretofore in use in the valve seats and seals and cause swelling and possibly disintegration of such seats and seals.

The swelling of the seats or seals increases any existing drag or friction and therefore increase the requisite actuation forces. This may result in exceeding the allowable operating limits of the actuation or linkage mechanisms which have been designed to open and close the valve.

BRIEF SUMMARY OF INVENTION

What is needed and what is provided by the present invention is a combination of a thin-walled primary seal with a lip and spring member, and a secondary body seal that will resist attack from the environment in which it operates. Further, it is desirable to have a primary and body seal combination that is dynamically self adjusting to accommodate pressure differentials on both sides of the valve, so that a higher pressure can be applied to either side of the valve and so that the valve functions when subjected to low pressure and vacuum conditions.

Where prior art devices could employ a solid seat with an elastomeric seal, the present invention employs a thin-walled primary seal with lip and spring member, in combination with a secondary "body" seal. The primary seal is provided by the combination of a thin-walled elastomeric membrane draping or jacketing (by means of "lips" in the thin-walled "jacket") a "v-shaped" cantilever spring that assures a positive seal under all operating conditions.

A gallery in the valve housing holds the elastomeric jacketed spring. The leading edge of the membranous jacket contains a slight bulbous thickening which bears against the ball. The resultant jacketed spring with a thickening on the leading edge can compress or expand, depending upon the forces to which it is subjected. The "v-shaped" spring supports the membranous elastomeric "jacket" tends towards an open position; thus keeping the leading edge in sealing engagement with the ball of the valve. The dimensions of the valve are chosen so that the ball is in equilibrium between the seals on both sides of the ball and floats in place. Any pressure differential experienced by the valve, when closed, is partially absorbed by the elasticity of the membranously jacketed spring.

The stiffness of the spring is chosen to permit easy actuation of the ball valve, under all fluid operating pressures that are to be encountered. This also provides the dynamic "self-adjusting" feature of the seal. Further, the fluid pressure may be considered an "energizing" factor that contributes to the integrity of the seal at all times. The resultant force between the primary seal and the ball, at the contact area assures positive sealing. Since the ball is permitted a limited amount of float in the seals, the operating force needed will remain more or less constant under a wide range of operating conditions i.e. vacuum low, and high pressure.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF DRAWINGS

FIG. 1 is a side view of a ball valve in which the present invention is useful;

FIG. 7 is an illustration of the principles of operation.

DETAILED DESCRIPTION OF THE DRAWINGS

Figure 2:
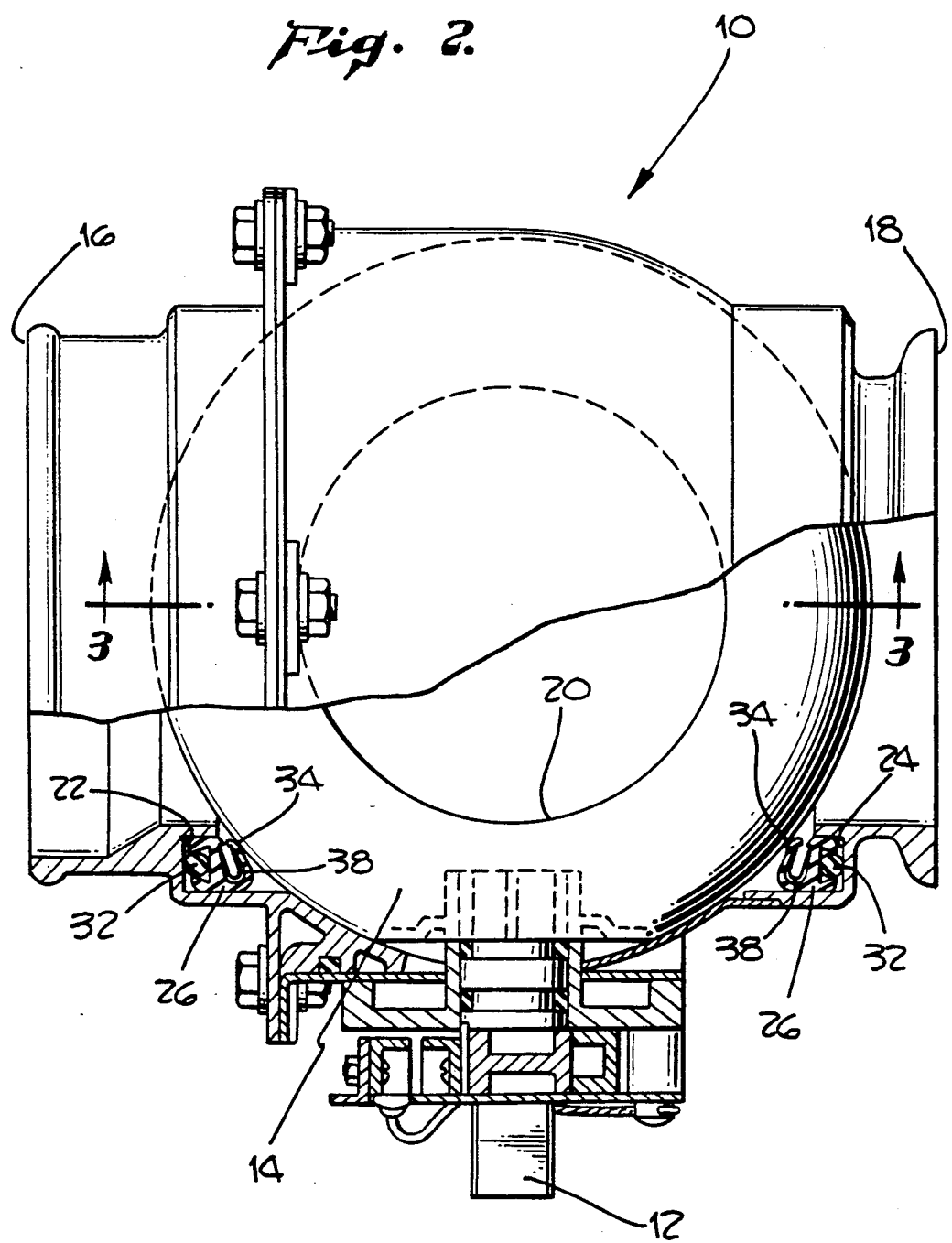
FIG. 2 is a partially sectional view of the valve of FIG. 1 taken along the line 2—2 in the direction of the appended arrows.

Turning first to FIGS. 1 and 2, there is shown a typical ball valve 10 such as is used, for example, in the waste system of an aircraft. An operating handle 12 is attached to the ball 14 and can rotate through approximately 90° to "open" and "close" the valve.

As shown, the ball valve is asymmetrical with different fittings on the ports 16, 18 of the valve. For convenience in description, the port 16 on the left in FIGS. 1 and 2 may be considered the input port and the port 18, on the right is then considered the output port.

According to the present invention, the choice is completely arbitrary although in designs of the prior art, the seals on the input and output sides of the ball were different, thereby dictating which port was which.

Figure 3A:
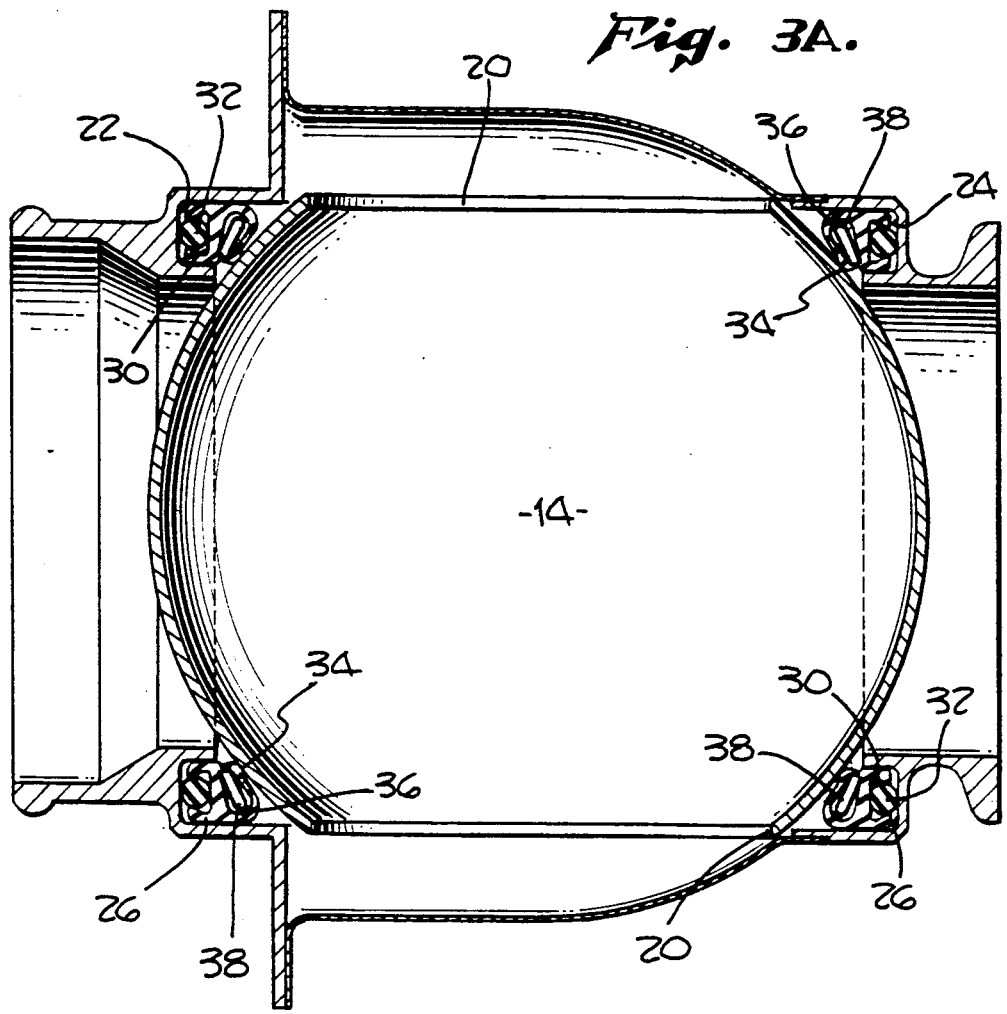
FIG. 3 including FIG. 3A
FIG. 3B is a sectional view of the valve of FIG. 2 taken along the line 3—3 in the direction of the appended arrows in the closed and open configuration, respectively.
Figure 4:
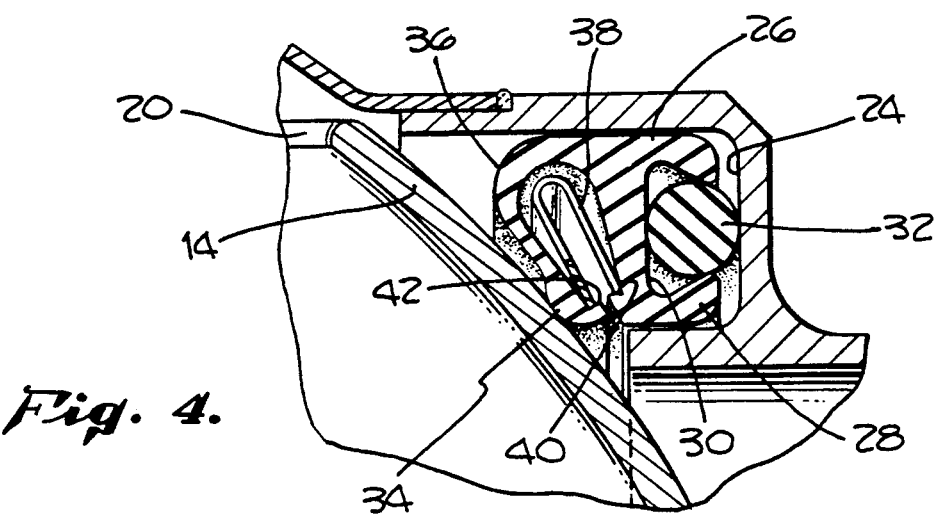
Figure 3B:
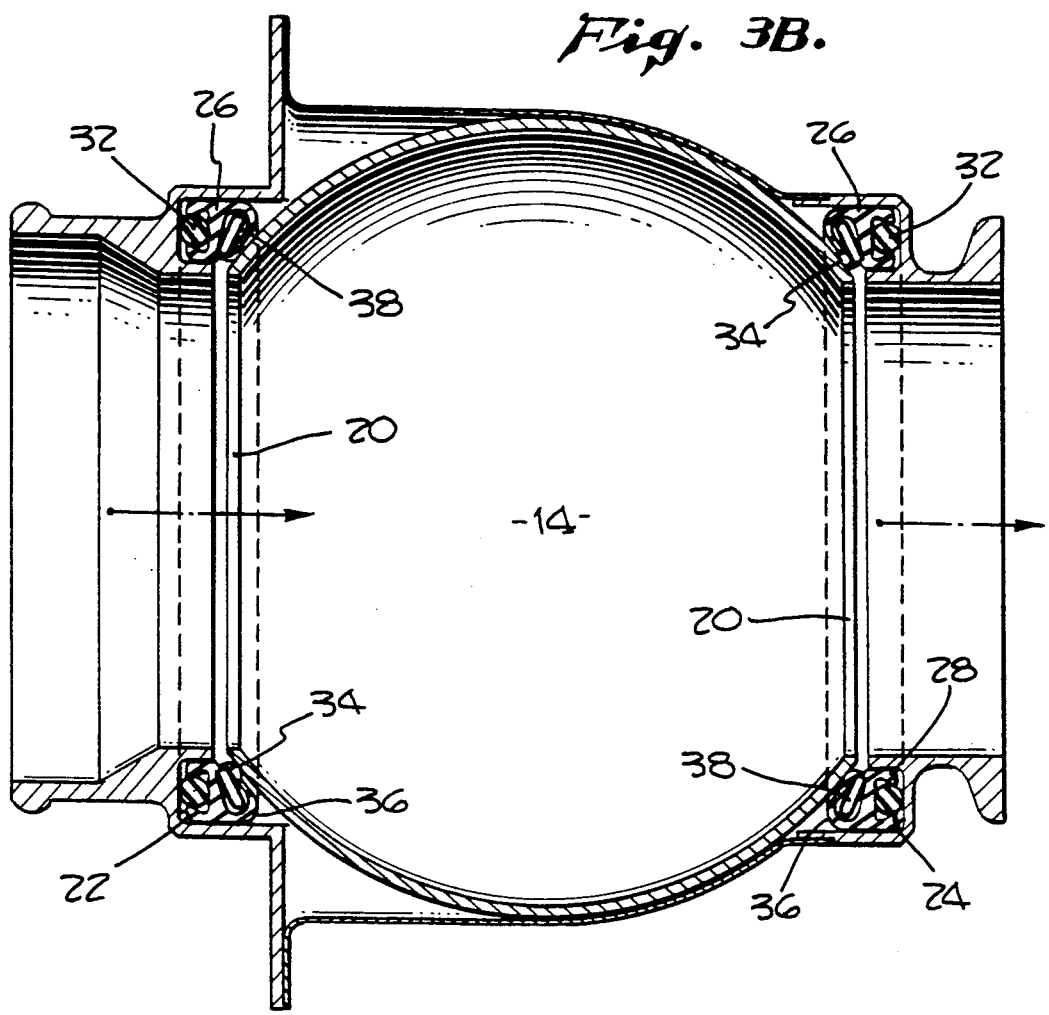

As seen in FIGS. 3A and 3B, there is a cylindrical aperture 20 that goes through the ball 14 with an axis that is orthogonal to the rotational axis as defined by the handle 12. As the handle 12 rotates the ball 14, the aperture 20 is either aligned with the ports 16, 18, in which event the valve is "open" (as in FIG. 3B), or is orthogonal to them, in which event the valve is "closed" (as in FIG. 3A).

Both the inlet port 16 and the outlet port 18 have seal retaining grooves 22, 24, respectively. Within the grooves 22, 24 are placed seal elements 26 which have a base portion 28 in which is placed a slot or groove 30 for holding O-rings 32. The O-rings 32 provide the secondary, body seal by means of O-ring 32 sealing the walls of groove 30 and the gallery 24. The primary seal is the dynamic combination of the convex edge 34 of a folded over thin-walled jacket 36 in conjunction with the supporting spring of the seal element. A pocket is formed in the thin-walled elastomeric jacket, inside of which is placed a generally v-shaped spring element 38 which supports the top 34.

Preferably, the spring element 38 is of stainless steel and is arranged to have the arms of the "v" extending outwardly so that the primary seal convex edge or tip 34 is biased into engagement with the ball 14.

Figure 4:
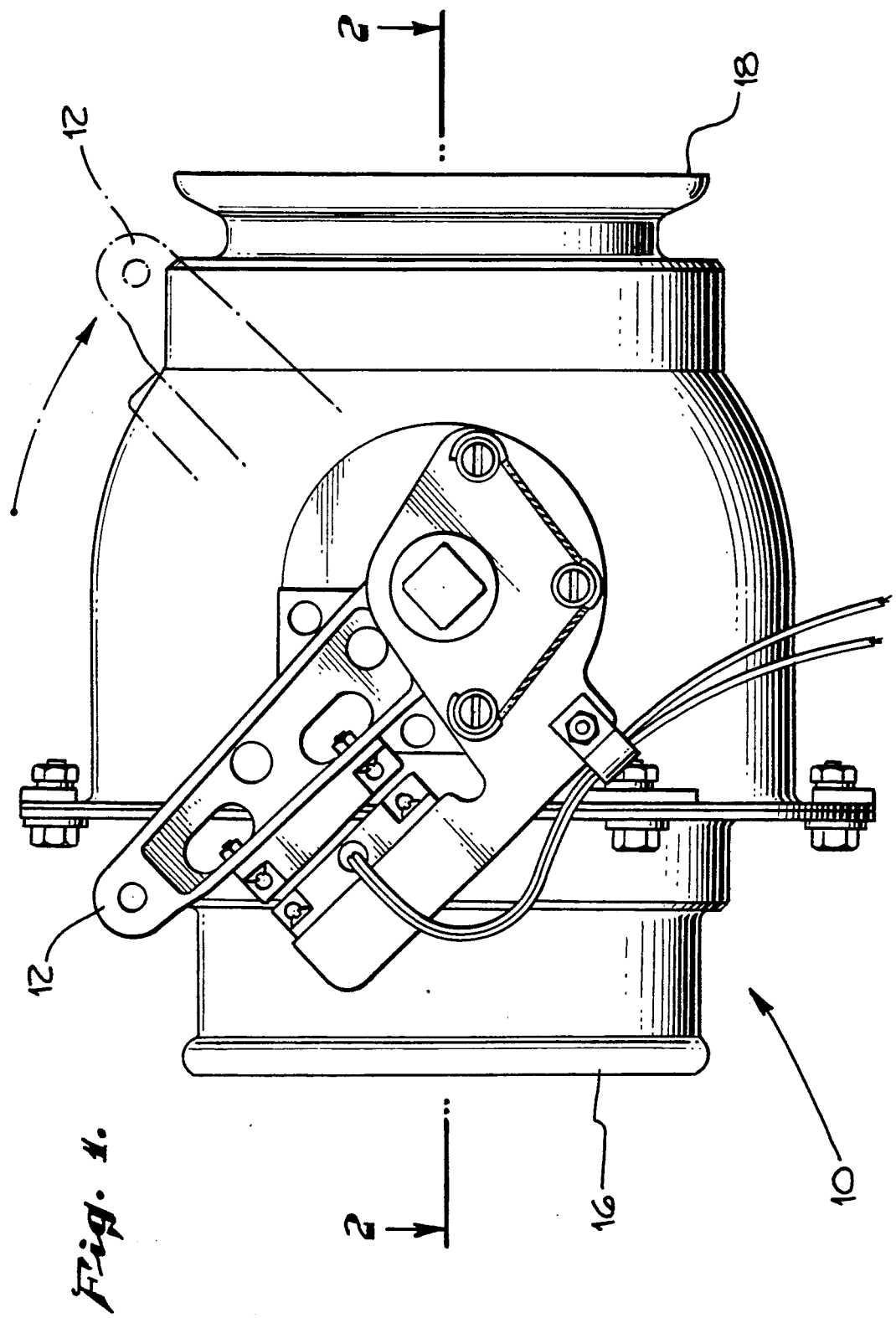
FIG. 4 is a detailed enlarged cross section view of a preferred embodiment of the seal of the present invention.

The dynamic self adjusting energized seal of the present invention is best seen in FIG. 4, which is an enlarged sectional view of a groove 22, 24 in which the seal element 26 is carried. As noted above, the convex edge or tip 34 of the thin wall or membrane jacket 36 in combination with the spring element 38 is considered the primary seal and the O-ring 32 is the secondary or body seal. To hold the spring 38 in place, a first shoulder 40 is provided in the base portion 28 of the seal element 26, and a second shoulder 42 is provided in the inner surface of the thin-walled jacket 36. The first and second shoulders 40, 42 are positioned so that the spring element 38 is permitted some movement within the pocket created between jacket 36 and the base portion 24.

As seen in FIG. 4, the sealing element 26 can accommodate movement of the ball 14 under the pressure differential that may exist between the intake and outlet ports. However, the primary seal is under sufficient spring force from spring element 38 to maintain a fluid tight engagement with the ball 14 to prevent any leakage, not only at the convex edge 34 but through the O-ring 32 body seals, as well.

Figure 5:
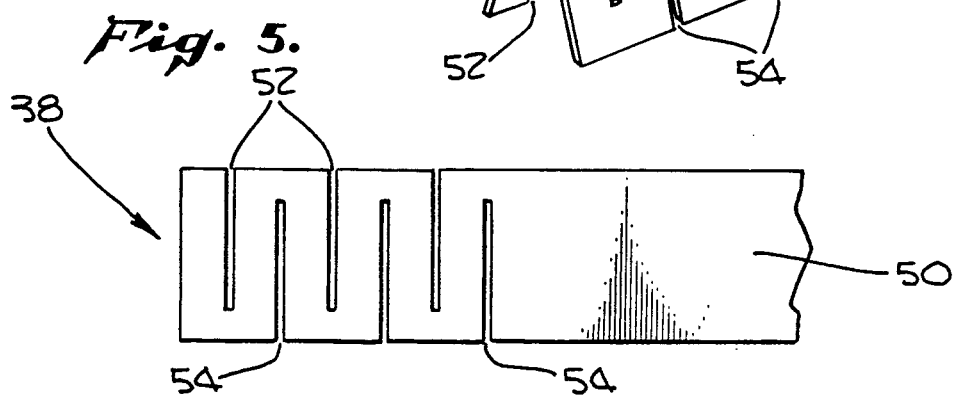
FIG. 5 is a view of a staggered-tooth design bias spring which supports the primary seal in an initial fabrication stage.

To achieve a suitable bias spring 38, one may start with a flat strip of spring steel 50 as shown in FIG. 5. Alternating cuts are made from opposing edges. As shown, first cuts 52 are made from the top down, and second cuts 54 are made from the bottom up. Adjacent first cuts 52 are spaced apart by the same amount as adjacent second cuts 54. Preferably, each cut removes a very narrow strip of material so that a normally straight strip can easily be formed into curves without deformation of the strip.

Obviously, the process to make the first and second cuts 52, 54 can be automated and an endless flat strip of spring steel can be produced. The flat strip 50 with the first and second cuts 52, 54 is next bent into a "v" shape. A length of spring, roughly equalling the circumference of interior of the "u" shaped jacket 36 of the primary seal is cut and is inserted into the interior of the jacket 36. The alternating first and second cuts 52, 54 give the finished spring 38 sufficient flexibility without substantial stress so that the spring 38 tends to remain in place with the aid of the first and second shoulders 40, 42.

The width of the first and second cuts 52, 54 can vary as a function of the circumference of the circle that is to be occupied. The primary task of the spring thus produced is to support the folded over jacket portion 36 of the seal element 26. As can be seen, a plurality of interconnected, side-by-side "v" shaped incremental spring elements are disposed about the interior of the jacket 36 of the elastomeric sealing member 26.

Figure 6:
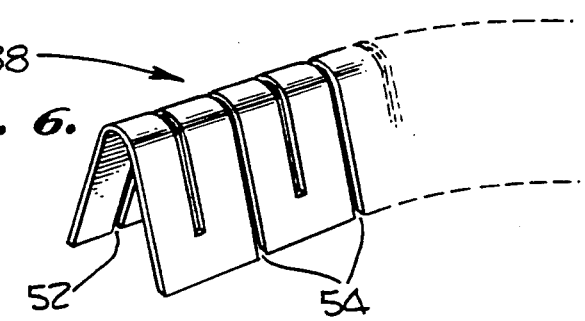
FIG. 6 is a perspective view of the staggered tooth "v" shaped bias spring of FIG. 5, just prior to installation.

The perspective view of FIG. 6 shows the cut spring member 38 after the bend but before assembly and insertion into the jacket 36 of the seal element 26. While this is a preferred embodiment and highly susceptible to automated production and assembly, this is not the only possible embodiment. Alternatives will occur to those skilled in the art and, accordingly, the invention should be limited only to the scope of the claims appended hereto.

What is claimed as new is:

1. For use with a ball valve having an apertured spherical valve member adapted to rotate between an open and closed configuration within a housing having a substantially spherical chamber within which the valve member rotates, including a seal gallery adjacent the chamber, a sealing member comprising:
   a. an elastomeric ring in the seal gallery having a base portion and a thin-walled jacket portion with a valve contacting portion on the exterior surface thereof as a primary seal, said jacket portion extending generally in the axial direction and forming a substantially u-shaped pocket between said jacket portion and said base portion of said ring; circumferential channel in the opposite surface of said base portion, adjacent a gallery body wall;
   b. an elongated, v-shaped spring member positioned within said u-shaped pocket with an arm of the v bearing against said jacket portion, and the other arm of the v bearing against said base portion of said ring,
   said spring member biasing said jacket portion and said valve contacting portion carried thereby into sealing engagement with the valve member; and
   c. an O ring body seal in said circumferential channel, biased by said spring member into sealing engagement with the gallery wall, thereby forming a primary seal between said valve containing portion and the spherical valve member and a body seal between said O ring and the gallery wall capable of floating with limited valve member motion.

2. The sealing member of claim 1, above, wherein said spring member includes a plurality of individual arms joined at the bases thereof in a staggered tooth design, extending around said ring.

3. The sealing member of claim 1, above, wherein the arms of said spring member extend generally in the axial direction and are in a staggered tooth design.

4. The sealing member of claim 1, above, wherein the inner peripheral surface of said jacket portion includes a retaining shoulder adapted to hold the outer edge of said spring arm within said pocket of said ring.

5. The sealing member of claim 1, above, wherein the inner peripheral surface of said base portion within said pocket includes a retaining shoulder adapted to hold an outer edge of said spring arm within said pocket of said ring.

6. The sealing member of claim 5, above, wherein the inner peripheral surface of said jacket portion includes a retaining shoulder adapted to hold the outer edge of said other spring arm within said pocket of said ring.

7. The sealing member of claim 1, above, wherein said spring member is formed from an elongated strip with adjacent partial lateral cuts extending to opposite edges in a staggered tooth design, after which said strip is folded into a "v" shape.

8. An improved ball valve comprising:
   a. an apertured ball valve member adapted to rotate about an axis orthogonal to the axis of said aperature;
   b. a generally spherical housing having axially aligned inlet and outlet ports, said ball valve member being located within said housing and aligned to have said valve member aperture coaxial with said ports;
   c. valve actuating mechanism adapted to rotate said ball valve between aligned and nonaligned orientations relative to said ports for opening and closing the valve, respectively;
   d. a circular seal gallery surrounding at least one of said ports for holding sealing elements;
   e. an elastomeric ring mounted within said seal gallery, said ring having a base portion distal from said valve member and a thin walled jacket portion distal from said contacting portion on the exterior surface thereof proximal said valve member, said jacket portion extending generally in an axial direction from said base portion and forming a substantially u-shaped pocket between said jacket portion and said base portion of said ring;
   f. an elongated, v-shaped spring member positioned within said u-shaped pocket with an arm of the v bearing against said jacket portion, and the other arm of the v bearing against said base portion of said ring,
   said spring member biasing said jacket portion and said valve contacting portion carried thereby into sealing engagement with said ball valve;
   g. a circumferential groove in the distal surface of said elastomeric ring adjacent a wall of said seal gallery; and
   h. a O ring in said circumferential groove and in sealing contact with a wall of said gallery to provide a body seal backing up the seal between the valve member and said jacket portion.

9. The ball valve of claim 8, above, wherein said spring member includes a plurality of individual arms joined at the bases thereof in a staggered tooth design, extending around said ring.

10. The ball valve of claim 8, above, wherein the arms of said spring member extend generally in the axial direction and are in a staggered tooth design.

* * * * *